US012657228B2

(12) United States Patent (10) Patent No.: US 12,657,228 B2
Gangadhar et al. (45) Date of Patent: Jun. 16, 2026

(54) COMBINATIONAL ANALYSIS FOR DOCUMENT CLASSIFICATION

(71) Applicant: International Business Machines Corporation, Armonk, NY (US)

(72) Inventors: Jayanth Gangadhar, Bengaluru (IN); Karthick Ramanujam, Chennai (IN); Vivek Venkatanarasaiah, Bengaluru (IN); Ullas M. Basavaraj, Bengaluru (IN); Ketan Gupta, Dera Bassi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/155,825

(22) Filed: Jan. 18, 2023

(65) Prior Publication Data

US 2024/0241898 A1 Jul. 18, 2024

(51) Int. Cl.
*G06F 16/35* (2025.01)
*G06F 16/383* (2019.01)

(52) U.S. Cl.
CPC ............ *G06F 16/35* (2019.01); *G06F 16/383* (2019.01)

(58) Field of Classification Search
CPC ............................... G06F 16/35; G06F 16/383
See application file for complete search history.

(56) References Cited

U.S. PATENT DOCUMENTS

| | | | | |
|---|---|---|---|---|
| 11,238,313 | B2 * | 2/2022 | Rezvani | .................. G06F 18/24 |
| 2009/0187598 | A1 * | 7/2009 | Vohariwatt | ............. G06Q 10/00 |

| | | | | |
|---|---|---|---|---|
| 2011/0137898 | A1 * | 6/2011 | Gordo | ..................... G06F 16/93 |
| | | | | 707/E17.089 |
| 2020/0151591 | A1 * | 5/2020 | Li | ........................... G06N 5/046 |
| 2020/0394396 | A1 * | 12/2020 | Yanamandra | ........ G06V 30/413 |
| 2022/0108126 | A1 | 4/2022 | Schieber et al. | |
| 2024/0203149 | A1 * | 6/2024 | Agrawal | ............... G06F 40/226 |

FOREIGN PATENT DOCUMENTS

KR 20190076302 A 7/2019

OTHER PUBLICATIONS

Anonymous, "Crowd Sourced Relabeling of Low Confidence Classifications of Document Sentiment", An IP.com Prior Art Database Technical Disclosure, IPCOM000218618D, Jun. 6, 2012, 6 pages.
Anonymous, "Document classification for populating timesheets," An IP.com Prior Art Database Technical Disclosure, IPCOM000176726D, Nov. 21, 2008, 2 pages.
Apte et al., "Induction of Rules for Document Classification", An IP.com Prior Art Database Technical Disclosure, PCOM000105176D, Original Publication Jun. 1, 1993, Electronic Publication Mar. 19, 2005, 5 pages.

(Continued)

*Primary Examiner* — Khanh B Pham

(74) *Attorney, Agent, or Firm* — Yee & Associates, P.C.

(57) ABSTRACT

Classifying documents is provided. A document is received for classification. The classification of the document is performed at an individual page level and an entire document level based on classification confidence scores generated by the machine learning document classification model at the individual page level and the entire document level to increase classification accuracy.

20 Claims, 5 Drawing Sheets

(56)　　　　　　　References Cited

OTHER PUBLICATIONS

Butt et al., "Cognitive Way of Classifying Documents: A Practitioner Approach," Journal of Global Research in Computer Science, vol. 4, No. 4, Apr. 2013, 4 pages.

Noi, "Automatic Document Classification with Machine Learning and AI," Xenit Solutions nv, Dec. 10, 2019, accessed Nov. 16, 2022, 7 pages.https://xenit.eu/automatic-document-classification-with-machine-learning-and-ai/.

Saranyajothi et al., "Machine Learning approach to Document Classification using Concept based Features," International Journal of Computer Applications, vol. 118, No. 20, May 2015, 5 pages.

Tanvir, "Multi Page Document Classification using Machine Learning and NLP," Published in Towards Data Science, Aug. 7, 2021, Accessed Dec. 8, 2022, 25 pages.https://towardsdatascience.com/multi-page-document-classification-using-machine-learning-and-nlp-ba6151405c03.

* cited by examiner

COMPUTING ENVIRONMENT
100

DOCUMENT CLASSIFICATION SYSTEM
201

DOCUMENT CLASSIFICATION PROCESS
300

FIG. 4A

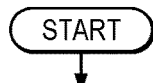

START

402 — COLLECT, BY A COMPUTER, FROM A SET OF HISTORIC DOCUMENT CLASSIFICATION USE CASES OF A SET OF ENTITIES, A PLURALITY OF SAMPLE PAGES CLASSIFIED INDIVIDUALLY BASED ON CONTENT OF EACH RESPECTIVE INDIVIDUAL PAGE AND A PLURALITY OF SAMPLE DOCUMENTS EACH CLASSIFIED AS AN ENTIRE DOCUMENT FROM A SET OF PAGES COMPRISING A GIVEN SAMPLE DOCUMENT OF THE PLURALITY OF SAMPLE DOCUMENTS BASED ON A RELATIONSHIP OF THE CONTENT ACROSS THE SET OF PAGES OF THAT GIVEN SAMPLE DOCUMENT

404 — TRAIN, BY THE COMPUTER, A MACHINE LEARNING DOCUMENT CLASSIFICATION MODEL UTILIZING THE PLURALITY OF SAMPLE PAGES CLASSIFIED INDIVIDUALLY BASED ON THE CONTENT OF EACH RESPECTIVE INDIVIDUAL PAGE AND THE PLURALITY OF SAMPLE DOCUMENTS EACH CLASSIFIED AS THE ENTIRE DOCUMENT FROM THE SET OF PAGES COMPRISING THE GIVEN SAMPLE DOCUMENT OF THE PLURALITY OF SAMPLE DOCUMENTS BASED ON THE RELATIONSHIP OF THE CONTENT ACROSS THE SET OF PAGES OF THAT GIVEN SAMPLE DOCUMENT

FROM FIG. 4B

B

406 — RECEIVE, BY THE COMPUTER, A DOCUMENT FOR CLASSIFICATION

408 — PERFORM, BY THE COMPUTER, USING THE MACHINE LEARNING DOCUMENT CLASSIFICATION MODEL, THE CLASSIFICATION OF THE DOCUMENT AT AN INDIVIDUAL PAGE LEVEL AND AN ENTIRE DOCUMENT LEVEL BASED ON CLASSIFICATION CONFIDENCE SCORES GENERATED BY THE MACHINE LEARNING DOCUMENT CLASSIFICATION MODEL AT THE INDIVIDUAL PAGE LEVEL AND THE ENTIRE DOCUMENT LEVEL TO INCREASE CLASSIFICATION ACCURACY

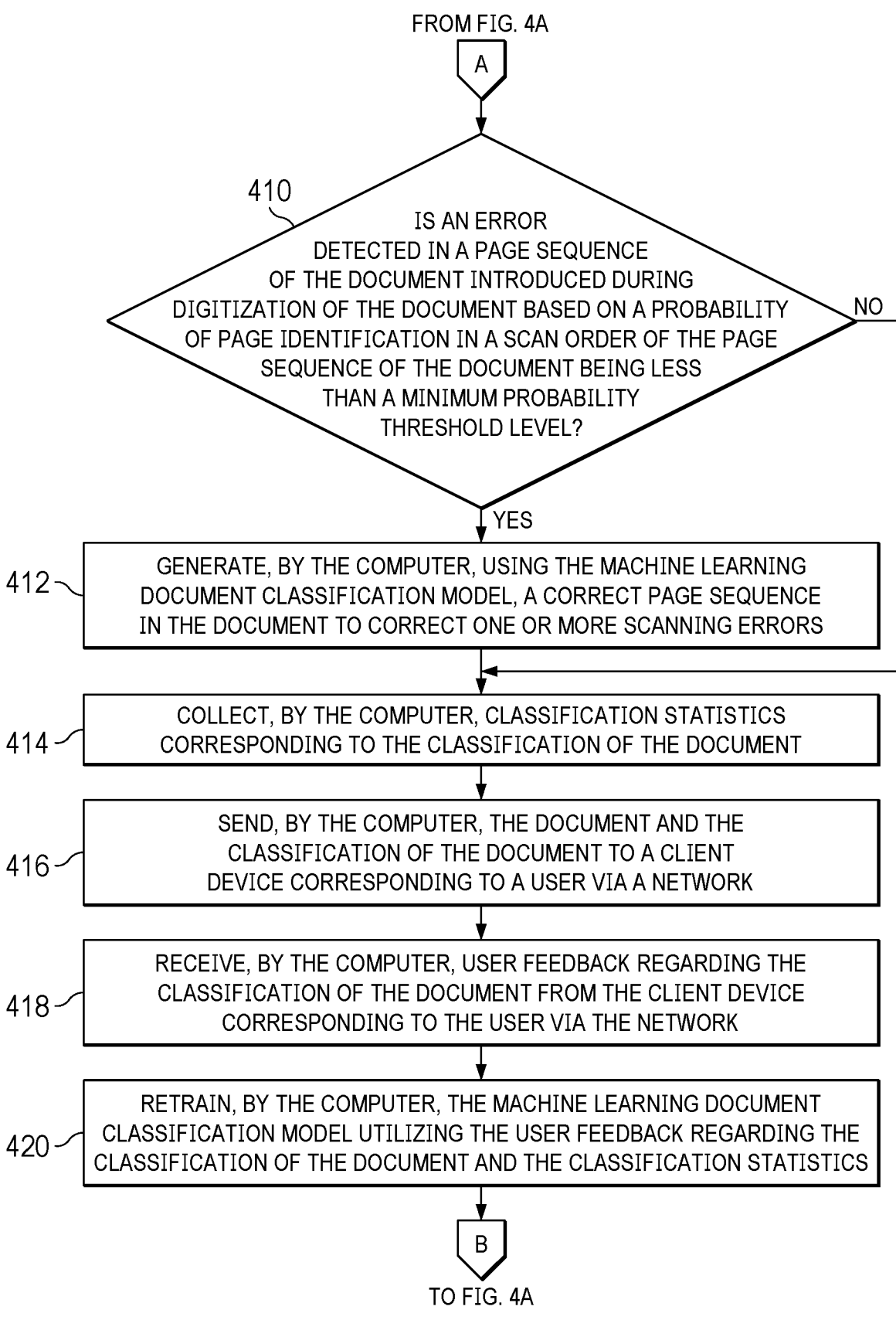

FROM FIG. 4A

A

410

IS AN ERROR DETECTED IN A PAGE SEQUENCE OF THE DOCUMENT INTRODUCED DURING DIGITIZATION OF THE DOCUMENT BASED ON A PROBABILITY OF PAGE IDENTIFICATION IN A SCAN ORDER OF THE PAGE SEQUENCE OF THE DOCUMENT BEING LESS THAN A MINIMUM PROBABILITY THRESHOLD LEVEL?

NO

YES

412 — GENERATE, BY THE COMPUTER, USING THE MACHINE LEARNING DOCUMENT CLASSIFICATION MODEL, A CORRECT PAGE SEQUENCE IN THE DOCUMENT TO CORRECT ONE OR MORE SCANNING ERRORS

414 — COLLECT, BY THE COMPUTER, CLASSIFICATION STATISTICS CORRESPONDING TO THE CLASSIFICATION OF THE DOCUMENT

416 — SEND, BY THE COMPUTER, THE DOCUMENT AND THE CLASSIFICATION OF THE DOCUMENT TO A CLIENT DEVICE CORRESPONDING TO A USER VIA A NETWORK

418 — RECEIVE, BY THE COMPUTER, USER FEEDBACK REGARDING THE CLASSIFICATION OF THE DOCUMENT FROM THE CLIENT DEVICE CORRESPONDING TO THE USER VIA THE NETWORK

420 — RETRAIN, BY THE COMPUTER, THE MACHINE LEARNING DOCUMENT CLASSIFICATION MODEL UTILIZING THE USER FEEDBACK REGARDING THE CLASSIFICATION OF THE DOCUMENT AND THE CLASSIFICATION STATISTICS

COMBINATIONAL ANALYSIS FOR DOCUMENT CLASSIFICATION

BACKGROUND

1. Field

The disclosure relates generally to document classification and more specifically to classifying a document at both an individual page level and an entire document level.

2. Description of the Related Art

Utilization of physical documents across all entities (e.g., enterprises, companies, businesses, organizations, institutions, agencies, and the like) incur huge investments and resources for data management. In addition, physical documents can have data loss due to missing or damaged pages. As a result, digitization and classification of these physical documents is needed for proper data management, such as storage, retrieval, and processing of information contained in these documents.

Document classification is a process of assigning a document to one or more classes. Documents to be classified may be textual documents, image documents, music documents, or the like. Each kind of document presents its own special classification issues. Documents may be classified according to their subjects or according to other attributes, such as, for example, document type, author, printing year, and the like.

Current document classification solutions include personnel preparing a set of documents for digitization. Each respective document of the set of documents is, for example, ordered in a random sequence. In addition, respective documents can be a single page document (e.g., social security card, driver license, diploma, or the like) or a multiple page document (e.g., an invoice, application form, phone bill, or the like).

Current document classification solutions identify each page based on a specific page type. For example, current document classification solutions may identify a first page as an invoice page, a second page as an invoice trailing page, a third page as an identification page, and subsequent pages as "other pages". Then, based on the identification of each respective page, current document classification solutions group the pages into individual documents. For example, current document classification solutions may group the first two pages as an invoice document, the third page as an identification document, and the remaining subsequent pages as an "other document".

One issue with current document classification solutions is, for example, personnel manually introducing errors during the document preparation phase (e.g., document retrieval and digitization phase), which is a time and resource consuming activity. Another issue is misclassification of documents by current document classification solutions. As a result of the misclassification of documents by current document classification solutions, personnel need to manually intervene to correct the document misclassifications. Thus, proper grouping of documents depends on the accuracy of document classification.

Current document classification solutions treat each page as an individual unit and identify each individual unit based on its keyword weightage only. In other words, current document classification solutions build a document based on the availability of keywords on each individual page. Thus, these current document classification solutions perform at a page level and create the document structure on the grouping of the individual pages based on keywords only.

Current document classification solutions do not take into account the relationship between pages across documents as a whole while identifying the pages or grouping the documents. For example, the grouping of the same document types spread at different locations or the separation of a document due to misplaced page order during document digitization (e.g., scanning) impacts document integrity. Consequently, preparation of proper document structure becomes a prominent activity for proper document classification, which consumes a substantial amount of time and resources in the preprocessing phase.

Further, if mistakes are identified in the postprocessing phase, then these mistakes lead to reclassification of documents by personnel, which consumes more time and resources and affects the overall turnaround time. In the case of a large number of pages per scan, a user needs to go through the entire set of scanned pages to verify document classification accuracy and make changes when needed. For example, the user needs to go through the entire content of each respective page to ensure proper document classification by current document classification solutions. In other words, proper grouping of pages into a document assists in document management. Improper document classification leads to improper data extraction and introduces errors in further processing steps. For example, transactions may need to be repeated or reprocessed due to introduction of document classification errors. As a result, accuracy of document classification needs to be increased for improved document management.

SUMMARY

According to one illustrative embodiment, a computer-implemented method for classifying documents is provided. A computer receives a document for classification. The computer, using a machine learning document classification model, performs the classification of the document at an individual page level and an entire document level based on classification confidence scores generated by the machine learning document classification model at the individual page level and the entire document level to increase classification accuracy. According to other illustrative embodiments, a computer system and computer program product for classifying documents are provided.

As a result, the illustrative embodiments understand structure and content of a document as a human would perceive that document. For example, the illustrative embodiments, using the machine learning model, simulate cognitive understanding of documents and classify a document at the individual page level and the entire document level, instead of at the individual page level only as performed by current document classification solutions, to increase the overall accuracy of document classifications.

Further, the illustrative embodiments optionally retrain the machine learning document classification model utilizing user feedback regarding the classification of the document and classification statistics corresponding to the classification of the document. As a result, the illustrative embodiments further increase the document classification accuracy of the machine learning document classification model.

BRIEF DESCRIPTION OF THE DRAWINGS

FIGS. 4A-4B are a flowchart illustrating a process for classifying documents in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
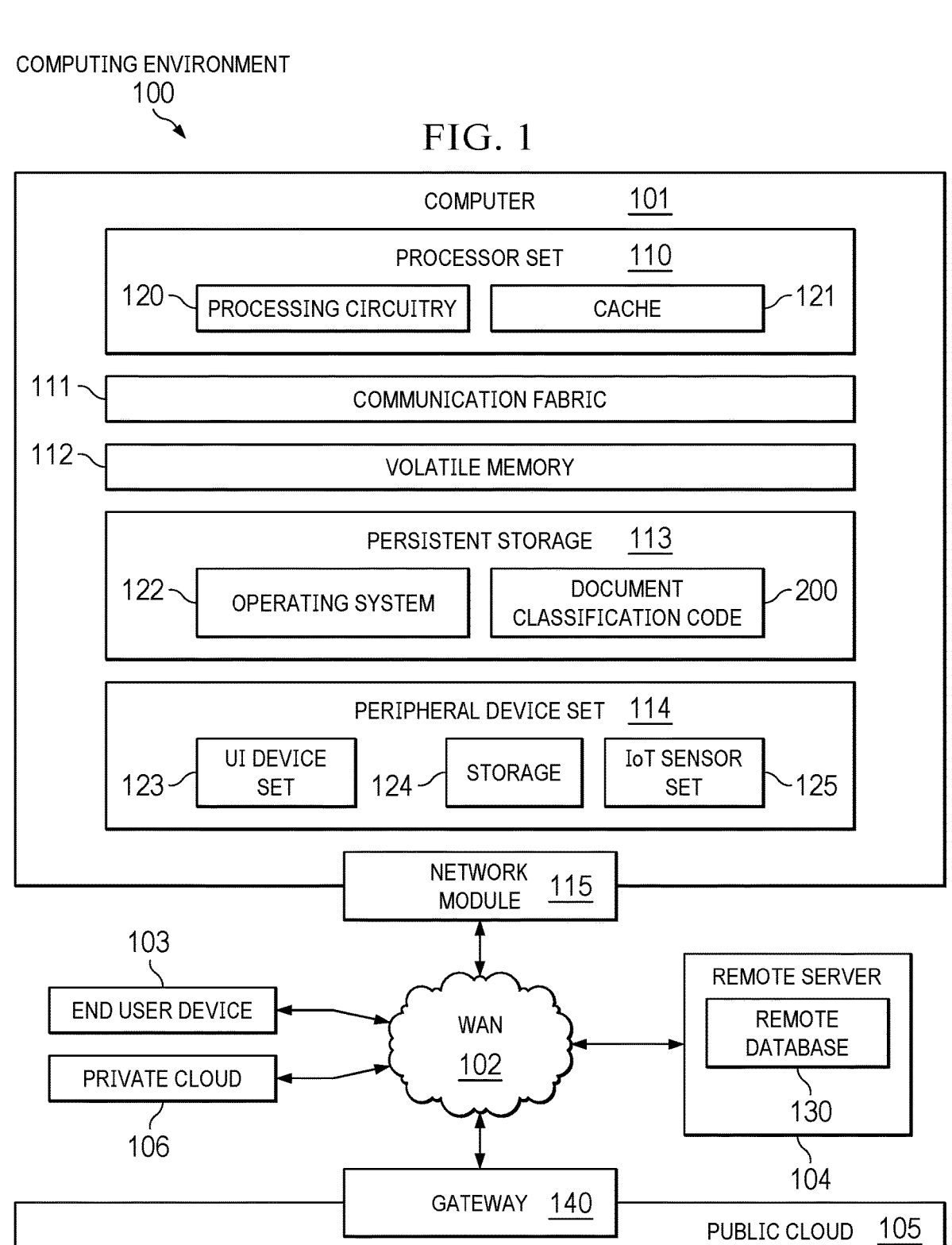
FIG. 1 is a pictorial representation of a computing environment in which illustrative embodiments may be implemented.
Figure 2:
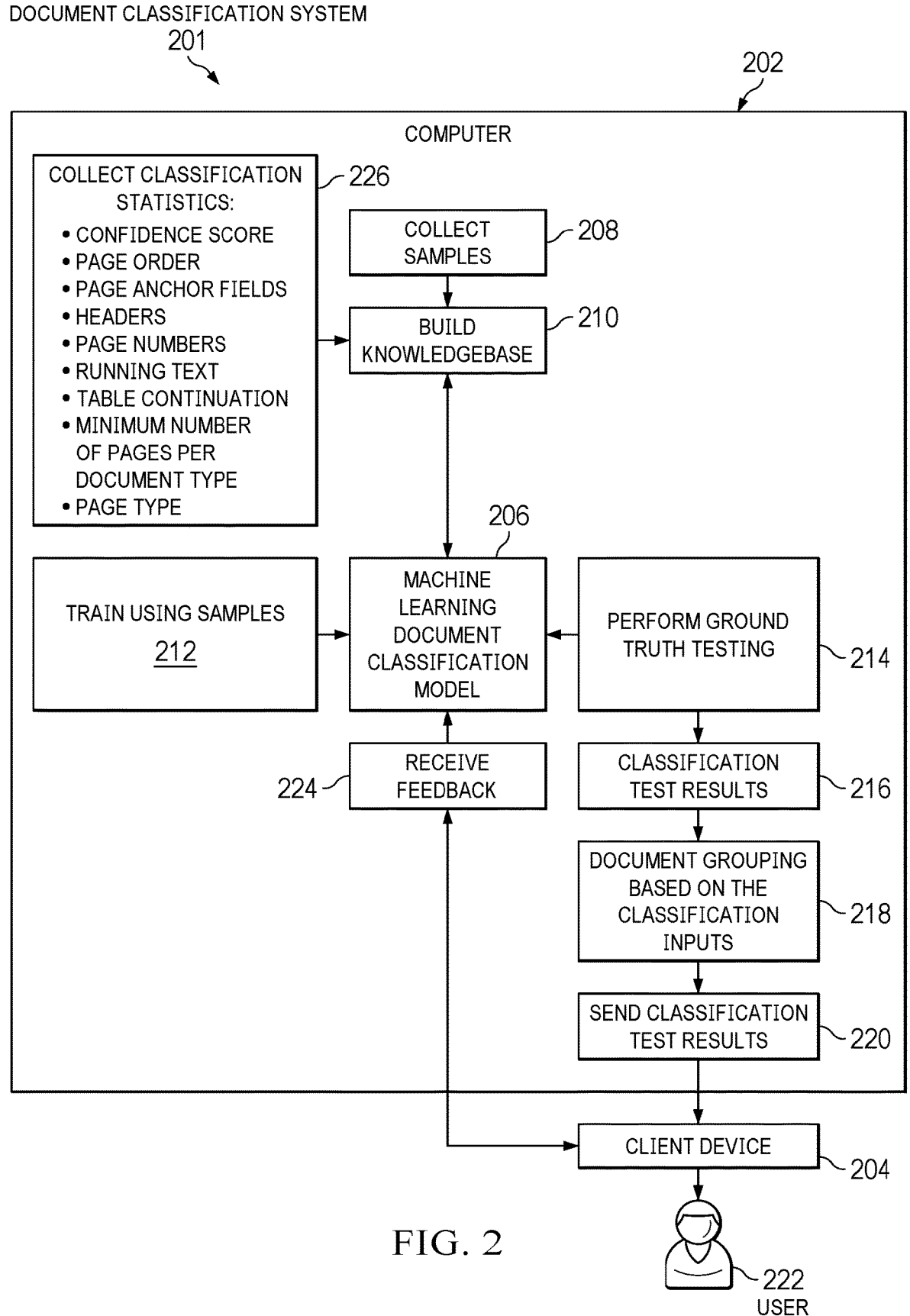
FIG. 2 is a diagram illustrating an example of a document classification system in accordance with an illustrative embodiment.
Figure 3:
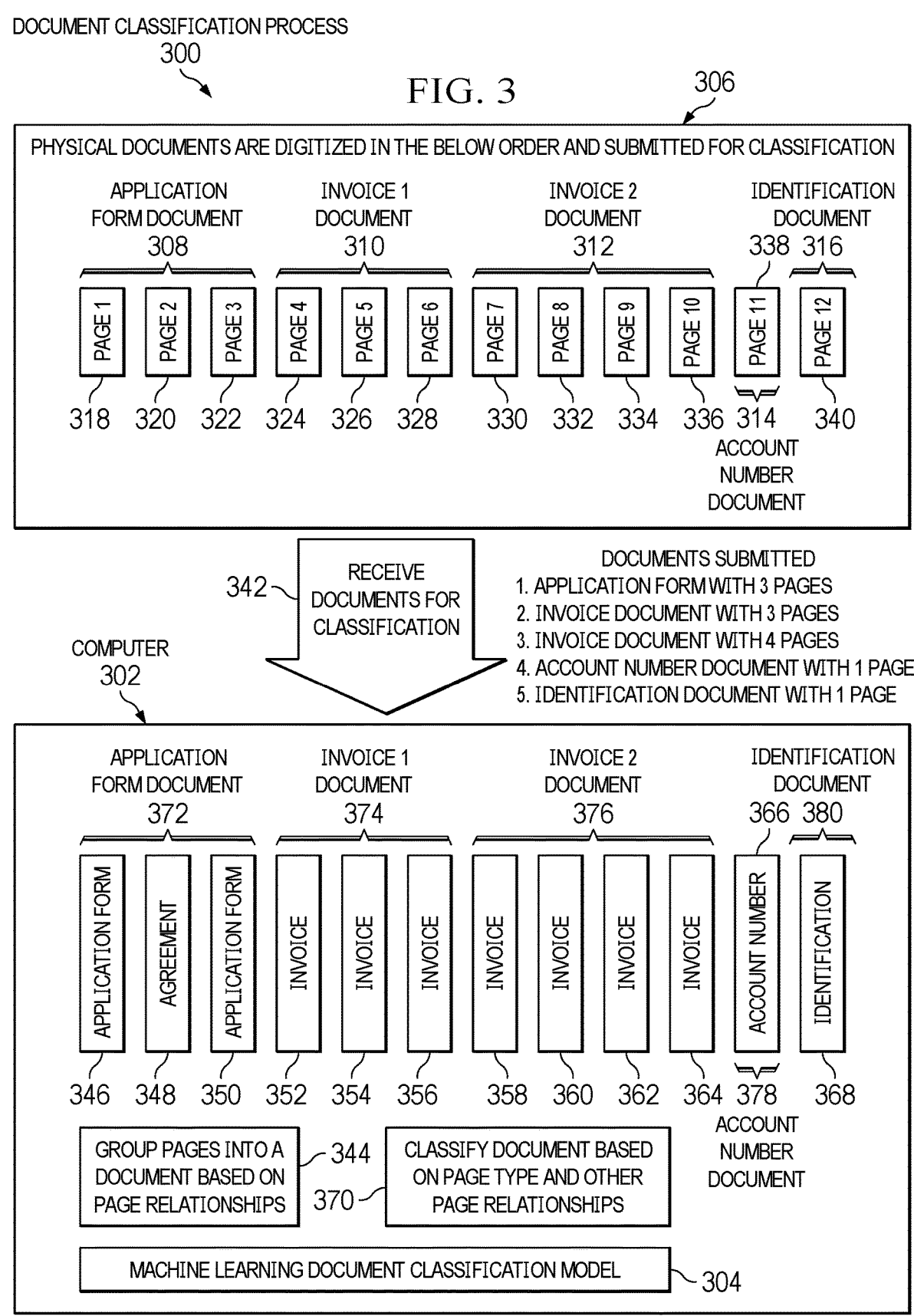
FIG. 3 is a diagram illustrating an example of a document classification process in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as document classification code 200. Document classification code 200 performs classification of a document at an individual page level and an entire document level based on classification confidence scores generated at the individual page level and the entire document level to increase classification accuracy.

In addition to document classification code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and document classification code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in document classification code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The document classification code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a customer of an entity that operates computer 101), and may take any of the forms discussed above in connection with computer 101. EUD 103 typically receives helpful and useful data from the operations of computer 101. For example, in a hypothetical case where computer 101 is designed to provide a document classification recommendation to an end user, this document classification recommendation would typically be communicated from network module 115 of computer 101 through WAN 102 to EUD 103. In this way, EUD 103 can display, or otherwise present, the document classification recommendation to the end user. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a document classification recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments.

Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Documents (e.g., applications, medical records, leases, deeds, titles, contracts, sales orders, emails, letters, memos, invoices, resumes, bills, and the like) are vital to entities across all domains. Some data ingestion processes are common across domains, such as, for example, on boarding new personnel, customers, products, and the like. Similarly, information, such as, for example, identifiers, addresses, phone numbers, account numbers, and the like, is collected. Further, some entities (e.g., financial institutions, government agencies, and the like) have specific document management guidelines such as where and how documents can be stored and how long these documents can be stored.

Across all domains, entities struggle with document management, such as, for example, discovering information contained inside PDF documents, emails, faxes, and physical paper documents. Entities need to automate document ingestion to automatically extract and utilize information contained in these documents.

Classification of a document identifies the type of the document based on the content of the document or context in which the document is submitted. Document classification can also be based on the packaging of a set of documents (e.g., application forms, invoices, or various customer documents such as utility bills). Digitized documents need to be classified and grouped for effective document management.

The extraction of information contained in a digitized document depends on identifying the digitized document in its corresponding context (e.g., business context). The storage and retention of digitized documents as per entity compliance depends on the types of these digitized documents. Thus, proper classification of these digitized documents initiates the document management process flow.

Illustrative embodiments utilize a machine learning document classification model to simulate human cognitive understanding to increase document classification accuracy. Illustrative embodiments take into account that understanding a document at two levels (i.e., at the individual page level and at the entire document level) increases the document classification accuracy. In other words, illustrative embodiments understand a given page as an individual unit and understand the entire document as a whole unit.

Illustrative embodiments generate the machine learning model as, for example, a relevance-based machine learning model for document classification. Illustrative embodiments train the machine learning document classification model using samples from the two-level approach of illustrative embodiments. For example, illustrative embodiments train the machine learning document classification model using sample pages classified individually based on content, such as keywords, of each respective individual page. Moreover, illustrative embodiments also train the machine learning document classification model using sample documents classified as an entire document from a set of pages comprising a given document based on the content relationship across the set of pages of that particular document. In other words, illustrative embodiments utilize individually classified sample pages and classified sample documents as a whole to train the machine learning document classification model. After training, the machine learning document classification model classifies a document based on generating a relevance-based weightage (e.g., a classification confidence score) on the classification of respective pages and a document as a whole to increase classification accuracy.

Illustrative embodiments generate a knowledgebase of document types and previously classified page and document samples from historic document classification use cases corresponding to one or more entities associated with a particular data domain. The data domain may be, for example, a business data domain, a banking data domain, a financial data domain, an insurance data domain, a healthcare data domain, an educational data domain, an entertainment data domain, a real estate data domain, a governmental data domain, an industrial data domain, or the like. Illustrative embodiments generate the machine learning document classification model as a supervised machine learning model augmented with relevance-based machine learning for classifying pages individually and documents as a whole. Illustrative embodiments train a first layer of the machine learning document classification model to classify individual pages based on content using a page level identifier, such as, for example, a title, table of contents, header, keywords, page numbers, content, and the like. Illustrative embodiments train a second layer of the machine learning document classification model to classify the entire document as a whole based on, for example, pages present in the document, page sequence or order in the document, and relationship of content across the pages in the document.

Illustrative embodiments split page and document samples into, for example, a 70:30 ratio. For example, illustrative embodiments utilize 70% of the page and document samples for training the machine learning document classification model and utilize the remaining 30% of the page and document samples as ground truth for testing the machine learning document classification model. However, it should be noted that a 70:30 ratio is meant as an example only and not as a limitation on illustrative embodiments. In other words, illustrative embodiments may utilize any ratio of page and document samples for training and testing of the machine learning document classification model.

Further, illustrative embodiments identify and collect document classification statistics for grouping of document pages. For example, illustrative embodiments collect page classification confidence scores (e.g., top 5 matching page types and their corresponding classification confidence score), page order or sequence, page anchor fields (e.g., page headers, page numbers, and the like), running text or table continuation on a next or subsequent page, defined minimum number of pages per identified document type, and the like. Furthermore, illustrative embodiments retrain the machine learning document classification model using up-to-date or current document classification statistics and user feedback regarding correct or incorrect document classifications made by the machine learning document classification model previously to further increase the document classification accuracy of the machine learning document classification model.

In response to illustrative embodiments invoking the machine learning document classification model, the machine learning document classification model classifies the individual pages of a document based on generated classification confidence scores. In addition, the machine learning document classification model checks the probability or likelihood of page identification in the scan order of the page sequence within the document. Further, the machine learning document classification model reorders pages to generate the correct page sequence in the document when the machine learning document classification model detects an error in the scanned page order. For example, the machine learning document classification model reorders pages of a document when the machine learning document classification model determines that the probability of page identification in the scan order of the page sequence of that particular document is less than a predetermined minimum probability threshold level.

Illustrative embodiments output the document and the classification of the document to a user. The user validates that the document classification by the machine learning document classification model is correct or makes a correction when the document classification is incorrect. The user provides the document classification validation or the document classification correction to illustrative embodiments as user feedback. The knowledgebase of the machine learning document classification model collects the document classification statistics for each document classification execution and the user feedback to enrich itself for further training of the machine learning document classification model.

As an illustrative example, the machine learning document classification model groups pages of a document using two steps. In the first step, the machine learning document classification model identifies pages having a high classification confidence score (i.e., greater than or equal to a minimum classification confidence score threshold value, such as, for example, 60, 65, 70, 75, 80, or the like). The machine learning document classification model sets the document type as per the identified page type. For example, the machine learning document classification model identifies a first page as an "Application Form Main Page" with 95% accuracy (i.e., a high classification confidence score). As a result, the machine learning document classification model sets the document type as an "Application Form" for the first page. In response to the machine learning document classification model identifying a next page having a low classification confidence score (i.e., lower than the minimum classification confidence score threshold value), the machine learning document classification model does not set the document type for that page. For example, in response to the machine learning document classification model identifying the next page as an "Other Page" with 30% accuracy (i.e., a low classification confidence score), the machine learning document classification model does not set any document type to that page.

In the second step, for each page having a low classification confidence score, the machine learning document classification model checks the probability or likelihood of occurrence of that page in the scan order. For example, the machine learning document classification model identifies a page as an "Application Form Main Page" with less than 30% accuracy. The probability of occurrence of that page in that scan order as a first page of the document is high as compared to other pages of that document. As a result, the machine learning document classification model sets the document type as "Application Form" for that page.

The machine learning document classification model also identifies the relationship of that page with one or more previous pages and one or more subsequent pages based on a set of criteria. The number of previous and subsequent pages that the machine learning document classification model checks for the relationship to that page is a configurable parameter (e.g., 1 page, 2 pages, 3 pages, or the like). The machine learning document classification model sets the document type for that page based on the defined "Minimum Number of Pages" for the document type corresponding to the previous page. For example, previously classified sample "Application Forms" used to train the machine learning document classification model are a minimum of 2 pages. As a result, the machine learning document classification model identifies the first page of the Application Form document as the "Application Form Main Page" with high accuracy and identifies the second page (i.e., the current page being processed) with less accuracy. In this example, the machine learning document classification model sets the document type as "Application Form" for the current page (i.e., the second page) based on the minimum number of pages for that document type.

If the minimum number of pages parameter for that particular document type is not available, then the machine learning document classification model checks for one or more other parameters (e.g., page anchor fields, such as a header, page number, running text onto a subsequent page, a table continuing on a subsequent page, and the like) with regard to the previous page document type and sets the document type for the current page accordingly. As an illustrative example, an invoice document type can be a single page or multiple pages. In this example, assume that the machine learning document classification model identifies the first page as an "Invoice Main Page" and identifies the next page with lower accuracy (i.e., a low classification confidence score). In this example, the machine learning document classification model checks for a page number reference, such as "Page 2", or checks for a table that started on the previous page (i.e., the first page) or a continuation of a paragraph from the previous page. In response to the machine learning document classification model detecting that at least one of these other parameters is met, then the machine learning document classification model sets the document type as "Invoice" for that next page (i.e., the second page).

The machine learning document classification model sends the document and the classification of that document to a user for manual document classification verification and user feedback. Illustrative embodiments also collect the document classification statistics for each document classification execution in the knowledgebase for retraining of the machine learning document classification model to increase document classification accuracy of the machine learning document classification model. The document classification statistics include, for example, at least one of page classification confidence scores, document classification confidence scores, document page sequences (e.g., main pages and trailing pages), page anchor fields, headers, page numbers, running text onto subsequent pages, tables continuing on subsequent pages, defined minimum number of pages corresponding to given types of documents, page types, keywords, and the like.

As a result, illustrative embodiments understand a structure and content of a document as a human would perceive that document. In other words, illustrative embodiments simulate cognitive understanding of documents using a trained machine learning model and classify a document at the individual page level and the entire document level, instead of at the individual page level only as performed by current document classification solutions. Further, illustrative embodiments utilize data corresponding to page relationships across the document and automatically reorder pages to correct preprocessing errors (e.g., scanning errors during digitization) based on the page relationship data. Therefore, illustrative embodiments increase the overall accuracy of document classifications and decrease the manual classification verification process post training of the machine learning document classification model.

Thus, illustrative embodiments provide one or more technical solutions that overcome a technical problem with misclassification of digitized documents by current document classification solutions. As a result, these one or more technical solutions provide a technical effect and practical application in the field of document classification.

With reference now to FIG. 2, a diagram illustrating an example of a document classification system is depicted in accordance with an illustrative embodiment. Document classification system 201 may be implemented in a computing environment, such as computing environment 100 in FIG. 1. Document classification system 201 is a system of hardware and software components for training a machine learning document classification model to accurately classify documents.

In this example, document classification system 201 includes computer 202 and client device 204. Computer 202 and client device 204 may be, for example, computer 101 and EUD 103 in FIG. 1. However, it should be noted that document classification system 201 is intended as an example only and not as a limitation on illustrative embodiments. For example, document classification system 201 may include any number of computers, client devices, and other devices and components not shown.

Computer 202 includes machine learning document classification model 206. Machine learning document classification model 206 can be implemented in, for example, document classification code 200 in FIG. 1. Also, machine learning document classification model 206 can be implemented as, for example, a supervised machine learning model. However, it should be noted that machine learning document classification model 206 can be implemented as a semi-supervised machine learning model or an unsupervised machine learning model. Computer 202 utilizes machine learning document classification model 206 to classifying documents at both the individual page level and the entire document level as a whole to increase document classification accuracy.

At 208, computer 202 collects sample pages and sample documents from historic document classification use cases associated with a specific data domain. It should be noted that each sample page has been classified individually and each sample document has been classified as a whole. At 210, computer 202 builds a knowledgebase comprising the collected sample pages and documents.

At 212, computer 202 trains machine learning document classification model 206 using the collected sample pages classified individually and the sample documents classified as a whole. Thus, computer 202 trains machine learning document classification model 206 at both the individual page level and the entire document level. It should be noted that computer 202 may utilize, for example, only 70% of the collected sample pages and sample documents to train machine learning document classification model 206. Thus, at 214, computer 202 utilizes the remaining 30% of the collected sample pages and sample documents to perform ground truth testing of machine learning document classification model 206.

At 216, computer 202 generates classification test results for machine learning document classification model 206. At 218, computer 202 performs document grouping based on classification inputs. At 220, computer 202 sends the classification test results to user 222 via client device 204. User 222 reviews the classification test results corresponding to machine learning document classification model 206 and sends feedback regarding the classification test results. At 224, computer 202 receives the user feedback. Further, at 226, computer 202 collects classification statistics corresponding to machine learning document classification model 206. Afterward, computer 202 utilizes the user feedback and the classification statistics to further train machine learning document classification model 206.

With reference now to FIG. 3, a diagram illustrating an example of a document classification process is shown in accordance with an illustrative embodiment. Document classification process 300 is implemented in computer 302, which includes machine learning document classification model 304. Computer 302 and machine learning document classification model 304 may be, for example, computer 202 and machine learning document classification model 206 in FIG. 2.

At 306, physical documents are digitized and submitted for classification by personnel. In this example, the digitized physical documents include application form document 308, invoice 1 document 310, invoice 2 document 312, account number document 314, and identification document 316. Also in this example, application form document 308 is comprised of page 1 318, page 2 320, and page 3 322; invoice 1 document 310 is comprised of page 4 324, page 5 326, and page 6 328; invoice 2 document 312 is comprised of page 7 330, page 8 332, page 9 334, and page 10 336; account number document 314 is comprised of page 11 338; and identification document 316 is comprised of page 12 340. However, it should be noted that the physical documents could be any type of documents and not limited to the documents shown and each document may be comprised of any number of pages.

At 342, computer 302 receives the documents for classification. At 344, computer 302 utilizes machine learning document classification model 304 to group pages into a document based on page relationships, such as, for example, content or the like. In this example, machine learning document classification model 304 groups application form page 346, agreement page 348, and application form page 350. Machine learning document classification model 304 also groups invoice page 352, invoice page 354, and invoice page 356. In addition, machine learning document classification model 304 groups invoice page 358, invoice page 360, invoice page 362, and invoice page 364. Further, machine learning document classification model 304 groups account number page 366 by itself. Furthermore, machine learning document classification model 304 also groups identification page 368 by itself.

At 370, computer 302 utilizes machine learning document classification model 304 to classify a particular document based on page type and other page relationships, such as, for example, title, header, page number, and the like. In this example, machine learning document classification model 304 classifies application form page 346, agreement page 348, and application form page 350 as application form document 372. Machine learning document classification model 304 classifies invoice page 352, invoice page 354, and invoice page 356 as invoice 1 document 374. Machine learning document classification model 304 classifies invoice page 358, invoice page 360, invoice page 362, and invoice page 364 as invoice 2 document 376. Machine learning document classification model 304 classifies account number page 366 as account number document 378. Finally, machine learning document classification model 304 classifies identification page 368 as identification document 380.

With reference now to FIGS. 4A-4B, a flowchart illustrating a process for classifying documents is shown in accordance with an illustrative embodiment. The process shown in FIGS. 4A-4B may be implemented in a computer, such as, for example, computer 101 in FIG. 1, computer 202 in FIG. 2, or computer 302 in FIG. 3. For example, the process shown in FIGS. 4A-4B may be implemented in document classification code 200 in FIG. 1, machine learning document classification model 206 in FIG. 2, or machine learning document classification model 304 in FIG. 3.

The process begins when the computer collects, from a set of historic document classification use cases of a set of entities associated with a specific data domain, a plurality of sample pages classified individually based on content of each respective individual page and a plurality of sample documents each classified as an entire document from a set of pages comprising a given sample document of the plurality of sample documents based on a relationship of the content across the set of pages of that given sample document (step 402). The computer trains a machine learning document classification model utilizing the plurality of sample pages classified individually based on the content of each respective individual page and the plurality of sample documents each classified as the entire document from the set of pages comprising the given sample document of the plurality of sample documents based on the relationship of the content across the set of pages of that given sample document to form a trained machine learning document classification model (step 404). The trained machine learning document classification model understands the structure and content of a document as a human would perceive that document by simulating cognitive understanding of that document.

Subsequently, the computer receives a document for classification (step 406). The document is a digitized document generated by a scanning process of a physical document. The computer, using the trained machine learning document classification model, performs the classification of the document at an individual page level and an entire document level based on classification confidence scores generated by the trained machine learning document classification model at the individual page level and the entire document level to increase classification accuracy (step 408).

The computer, using the trained machine learning document classification model, makes a determination as to whether an error is detected in a page sequence of the document introduced during digitization of the document based on a probability of page identification in a scan order of the page sequence of the document being less than a minimum probability threshold level (step 410). If the computer, using the trained machine learning document classification model, determines that no error is detected in the page sequence of the document introduced during the digitization of the document based on the probability of page identification in the scan order of the page sequence of the document being greater than or equal to the minimum probability threshold level, no output of step 410, then the process proceeds to step 414. If the computer, using the trained machine learning document classification model, determines that an error is detected in the page sequence of the document introduced during the digitization of the document based on the probability of page identification in the scan order of the page sequence of the document being less than the minimum probability threshold level, yes output of step 410, then the computer, using the trained machine learning document classification model, generates a correct page sequence in the document to correct one or more scanning errors (step 412).

Further, the computer collects classification statistics corresponding to the classification of the document (step 414). The classification statistics include, for example, at least one of page classification confidence scores for the document, a document classification confidence score for the document, document page sequence of the document, page anchor fields of the document, headers of the document, page numbers of the document, running text onto a subsequent page of the document, a table continuing on a subsequent page of the document, a defined minimum number of pages corresponding to a type of the document, page types of the document, keywords of the document, and the like.

The computer sends the document and the classification of the document to a client device corresponding to a user via a network (step 416). Afterward, the computer receives user feedback regarding the classification of the document from the client device corresponding to the user via the network (step 418). The computer retrains the machine learning document classification model utilizing the user feedback regarding the classification of the document and the classification statistics corresponding to the classification of the document (step 420). As a result of the computer retaining the machine learning document classification model, the computer further increases the document classification accuracy of the machine learning document classification model. Thereafter, the process returns to step 406 where the computer waits to receive another document for classification.

Thus, illustrative embodiments of the present invention provide a computer-implemented method, computer system, and computer program product for classifying a document at an individual page level and an entire document level to increase document classification accuracy. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for classifying documents, the computer-implemented method comprising:

splitting, by a computer, a plurality of sample pages classified individually based on content of each respective individual page and a plurality of sample documents each classified as an entire document from a set of pages comprising a given sample document of the plurality of sample documents based on relationship of the content across the set of pages of that given sample document into a specified greater percentage of samples that is more than half of a total percentage of samples for training a machine learning document classification model and a specified remaining lesser percentage of samples that is less than half of the total percentage of samples as ground truth for testing the machine learning document classification model;

training, by the computer, the machine learning document classification model utilizing the specified greater percentage of samples of the plurality of sample pages classified individually based on the content of each respective individual page and the specified greater percentage of samples of the plurality of sample documents each classified as the entire document from the set of pages comprising the given sample document of the plurality of sample documents based on the relationship of the content across the set of pages of that given sample document;

testing, by the computer, the machine learning document classification model utilizing as the ground truth the specified remaining lesser percentage of samples of the plurality of sample pages classified individually and the specified remaining lesser percentage of samples of the plurality of sample documents each classified as the entire document;

receiving, by the computer, a document for classification; and performing, by the computer, using the machine learning document classification model, the classification of the document at an individual page level and an entire document level based on classification confidence scores generated by the machine learning document classification model at the individual page level and the entire document level to increase classification accuracy.

2. The computer-implemented method of claim 1, further comprising:

collecting, by the computer, from a set of historic document classification use cases of a set of entities associated with a specific data domain, the plurality of sample pages classified individually based on the content of each respective individual page and the plurality of sample documents each classified as the entire document from the set of pages comprising the given sample document of the plurality of sample documents based on the relationship of the content across the set of pages of that given sample document.

3. The computer-implemented method of claim 1, further comprising:

determining, by the computer, using the machine learning document classification model, whether an error is detected in a page sequence of the document introduced during digitization of the document based on a probability of page identification in a scan order of the page sequence of the document being less than a minimum probability threshold level; and responsive to the computer, using the machine learning document classification model, determining that an error is detected in the page sequence of the document introduced during the digitization of the document based on the probability of page identification in the scan order of the page sequence of the document being less than the minimum probability threshold level, generating, by the computer, using the machine learning document classification model, a correct page sequence in the document to correct one or more scanning errors.

4. The computer-implemented method of claim 1, further comprising:

collecting, by the computer, classification statistics corresponding to the classification of the document, the classification statistics including page classification confidence scores for the document, a document classification confidence score for the document, document page sequence of the document, page anchor fields of the document, headers of the document, page numbers of the document, running text onto a subsequent page of the document, a table continuing on a subsequent page of the document, a defined minimum number of pages corresponding to a type of the document, page types of the document, and keywords of the document.

5. The computer-implemented method of claim 1, further comprising:

sending, by the computer, the document and the classification of the document to a client device corresponding to a user via a network; and receiving, by the computer, user feedback regarding the classification of the document from the client device corresponding to the user via the network.

6. The computer-implemented method of claim 1, further comprising:

retraining, by the computer, the machine learning document classification model utilizing user feedback regarding the classification of the document and classification statistics corresponding to the classification of the document.

7. The computer-implemented method of claim 1, wherein the document is a digitized document generated by a scanning process of a physical document.

8. A computer system for classifying documents, the computer system comprising:

a communication fabric;

a storage device connected to the communication fabric, wherein the storage device stores program instructions; and a processor connected to the communication fabric, wherein the processor executes the program instructions to:

split a plurality of sample pages classified individually based on content of each respective individual page and a plurality of sample documents each classified as an entire document from a set of pages comprising a given sample document of the plurality of sample documents based on relationship of the content across the set of pages of that given sample document into a specified greater percentage of samples that is more than half of a total percentage of samples for training a machine learning document classification model and a specified remaining lesser percentage of samples that is less than half of the total percentage of samples as ground truth for testing the machine learning document classification model;

train the machine learning document classification model utilizing the specified greater percentage of samples of the plurality of sample pages classified individually based on the content of each respective individual page and the specified greater percentage of samples of the plurality of sample documents each classified as the entire document from the set of pages comprising the given sample document of the plurality of sample documents based on the relationship of the content across the set of pages of that given sample document;

test the machine learning document classification model utilizing as the ground truth the specified remaining lesser percentage of samples of the plurality of sample pages classified individually and the specified remaining lesser percentage of samples of the plurality of sample documents each classified as the entire document;

receive a document for classification; and perform, using the machine learning document classification model, the classification of the document at an individual page level and an entire document level based on classification confidence scores generated by the machine learning document classification model at the individual page level and the entire document level to increase classification accuracy.

9. The computer system of claim 8, wherein the processor further executes the program instructions to:

collect, from a set of historic document classification use cases of a set of entities associated with a specific data domain, the plurality of sample pages classified individually based on the content of each respective individual page and the plurality of sample documents each classified as the entire document from the set of pages comprising the given sample document of the plurality of sample documents based on the relationship of the content across the set of pages of that given sample document.

10. The computer system of claim 8, wherein the processor further executes the program instructions to:

determine, using the machine learning document classification model, whether an error is detected in a page sequence of the document introduced during digitization of the document based on a probability of page identification in a scan order of the page sequence of the document being less than a minimum probability threshold level; and generate, using the machine learning document classification model, a correct page sequence in the document to correct one or more scanning errors in response to the machine learning document classification model determining that an error is detected in the page sequence of the document introduced during the digitization of the document based on the probability of page identification in the scan order of the page sequence of the document being less than the minimum probability threshold level.

11. The computer system of claim 8, wherein the processor further executes the program instructions to:

collect classification statistics corresponding to the classification of the document, the classification statistics including page classification confidence scores for the document, a document classification confidence score for the document, document page sequence of the document, page anchor fields of the document, headers of the document, page numbers of the document, running text onto a subsequent page of the document, a table continuing on a subsequent page of the document, a defined minimum number of pages corresponding to a type of the document, page types of the document, and keywords of the document.

12. The computer system of claim 8, wherein the processor further executes the program instructions to:

send the document and the classification of the document to a client device corresponding to a user via a network; and receive user feedback regarding the classification of the document from the client device corresponding to the user via the network.

13. The computer system of claim 8, wherein the processor further executes the program instructions to:

retrain the machine learning document classification model utilizing user feedback regarding the classification of the document and classification statistics corresponding to the classification of the document.

14. A computer program product for classifying documents, the computer program product comprising a computer-readable storage medium having program instructions embodied therewith, the program instructions executable by a computer to cause the computer to perform a method of:

splitting, by the computer, a plurality of sample pages classified individually based on content of each respective individual page and a plurality of sample documents each classified as an entire document from a set of pages comprising a given sample document of the plurality of sample documents based on relationship of the content across the set of pages of that given sample document into a specified greater percentage of samples that is more than half of a total percentage of samples for training a machine learning document classification model and a specified remaining lesser percentage of samples that is less than half of the total percentage of samples as ground truth for testing the machine learning document classification model;

training, by the computer, the machine learning document classification model utilizing the specified greater percentage of samples of the plurality of sample pages classified individually based on the content of each respective individual page and the specified greater percentage of samples of the plurality of sample documents each classified as the entire document from the set of pages comprising the given sample document of the plurality of sample documents based on the relationship of the content across the set of pages of that given sample document;

testing, by the computer, the machine learning document classification model utilizing as the ground truth the specified remaining lesser percentage of samples of the plurality of sample pages classified individually and the specified remaining lesser percentage of samples of the plurality of sample documents each classified as the entire document;

receiving, by the computer, a document for classification; and performing, by the computer, using the machine learning document classification model, the classification of the document at an individual page level and an entire document level based on classification confidence scores generated by the machine learning document classification model at the individual page level and the entire document level to increase classification accuracy.

15. The computer program product of claim 14, further comprising:

collecting, by the computer, from a set of historic document classification use cases of a set of entities associated with a specific data domain, the plurality of sample pages classified individually based on the content of each respective individual page and the plurality of sample documents each classified as the entire document from the set of pages comprising the given sample document of the plurality of sample documents based on the relationship of the content across the set of pages of that given sample document.

16. The computer program product of claim 14, further comprising:

determining, by the computer, using the machine learning document classification model, whether an error is detected in a page sequence of the document introduced during digitization of the document based on a probability of page identification in a scan order of the page sequence of the document being less than a minimum probability threshold level; and responsive to the computer, using the machine learning document classification model, determining that an error is detected in the page sequence of the document introduced during the digitization of the document based on the probability of page identification in the scan order of the page sequence of the document being less than the minimum probability threshold level, generating, by the computer, using the machine learning document classification model, a correct page sequence in the document to correct one or more scanning errors.

17. The computer program product of claim 14, further comprising:

collecting, by the computer, classification statistics corresponding to the classification of the document, the classification statistics including page classification confidence scores for the document, a document classification confidence score for the document, document page sequence of the document, page anchor fields of the document, headers of the document, page numbers of the document, running text onto a subsequent page of the document, a table continuing on a subsequent page of the document, a defined minimum number of pages corresponding to a type of the document, page types of the document, and keywords of the document.

18. The computer program product of claim 14, further comprising:

sending, by the computer, the document and the classification of the document to a client device corresponding to a user via a network; and receiving, by the computer, user feedback regarding the classification of the document from the client device corresponding to the user via the network.

19. The computer program product of claim 14, further comprising:

retraining, by the computer, the machine learning document classification model utilizing user feedback regarding the classification of the document and classification statistics corresponding to the classification of the document.

20. The computer program product of claim 14, wherein the document is a digitized document generated by a scanning process of a physical document.

\* \* \* \* \*